(12) United States Patent
Balint et al.

(10) Patent No.: US 7,969,883 B2
(45) Date of Patent: Jun. 28, 2011

(54) RETRANSMISSION SCHEME FOR LOSSY MEDIA

(75) Inventors: Zoltan Balint, Borsbeek (BE); Jan Sylvia Verlinden, Wommelgem (BE); Geert Bert Maarten Ysebaert, Winksele (BE)

(73) Assignee: Alcatel Lucent, Paris (FR)

( * ) Notice: Subject to any disclaimer, the term of this patent is extended or adjusted under 35 U.S.C. 154(b) by 394 days.

(21) Appl. No.: 11/958,364

(22) Filed: Dec. 17, 2007

(65) Prior Publication Data

US 2008/0151775 A1 Jun. 26, 2008

(30) Foreign Application Priority Data

Dec. 20, 2006 (EP) .................................. 06292019

(51) Int. Cl.
*H04L 1/08* (2006.01)
(52) U.S. Cl. .......................... 370/235; 370/230; 714/748
(58) Field of Classification Search .................. 370/230, 370/230.1, 231–235, 252–253, 465, 468; 455/8–10, 24, 68–69; 714/1–2, 18, 748–750
See application file for complete search history.

(56) References Cited

U.S. PATENT DOCUMENTS

| | | | |
|---|---|---|---|
| 5,684,791 A | 11/1997 | Raychaudhuri et al. | |
| 5,896,371 A * | 4/1999 | Kobayashi et al. | 370/232 |
| 6,148,005 A * | 11/2000 | Paul et al. | 370/469 |
| 6,205,119 B1 * | 3/2001 | Kaczynski | 370/231 |
| 6,275,471 B1 * | 8/2001 | Bushmitch et al. | 370/248 |
| 6,894,983 B1 * | 5/2005 | Lederman et al. | 370/252 |
| 7,145,919 B2 * | 12/2006 | Krishnarajah et al. | 370/474 |
| 7,167,449 B2 * | 1/2007 | Ikeda et al. | 370/235 |
| 7,181,485 B1 * | 2/2007 | Lau et al. | 718/100 |
| 7,200,144 B2 * | 4/2007 | Terrell et al. | 370/389 |
| 7,292,567 B2 * | 11/2007 | Terrell et al. | 370/363 |
| 7,536,473 B2 * | 5/2009 | Ajanovic et al. | 709/234 |
| 7,813,294 B2 * | 10/2010 | Xiang | 370/252 |
| 7,911,956 B2 * | 3/2011 | Schmidt | 370/235 |
| 2003/0103459 A1 * | 6/2003 | Connors et al. | 370/235 |
| 2003/0161303 A1 * | 8/2003 | Mehrvar et al. | 370/386 |
| 2004/0052263 A1 * | 3/2004 | Xu | 370/399 |
| 2006/0067356 A1 * | 3/2006 | Kim et al. | 370/452 |
| 2006/0129723 A1 * | 6/2006 | Green et al. | 710/106 |
| 2007/0008988 A1 * | 1/2007 | Kim et al. | 370/462 |
| 2007/0171928 A1 * | 7/2007 | Kim et al. | 370/412 |

FOREIGN PATENT DOCUMENTS

| | | |
|---|---|---|
| EP | 1672826 A2 | 6/2006 |
| WO | WO 2005/034418 A1 | 4/2005 |

* cited by examiner

*Primary Examiner* — Chi H. Pham
*Assistant Examiner* — Kevin Mew
(74) *Attorney, Agent, or Firm* — Harness, Dickey & Pierce, P.L.C.

(57) ABSTRACT

A transmitter device (210) and associated receiver device (211) providing a retransmission scheme for use in communications involving lossy media. The transmitter device (210) receives data packets (201) from a source and adds protection to selected subflows before delivering (203, 206) them to the receiver device (211). The receiver device (211) is able to remove the protection and process (207) the data packets further. The retransmission scheme introduces greater reliability on the lossy medium by restricting the retransmission (208, 209) to a particular link and to selected subflows of traffic in the connection between a source and a destination.

8 Claims, 3 Drawing Sheets

RETRANSMISSION SCHEME FOR LOSSY MEDIA

FIELD OF THE INVENTION

The present invention generally relates to the problem of lossy media used in digital data communication systems, and discloses a retransmission scheme which deals with the loss or corruption of information in real-time when resource critical services or applications such as streaming video are deployed over lossy media such as wireless links or low quality wires.

BACKGROUND OF THE INVENTION

A key component in a communication system is the medium used to transport information. Any failure at this level results in corrupted information or loss of information. Particular media are more prone to generating such failures than others. For instance, a radio wave link is more likely to introduce problems in the communication than an optical fibre link. Fibre links are well shielded from outside light, so no or little noise can be inserted into the information transported over the link. A radio wave link however, will easily interfere with other radio waves in the air. Thus, a radio link is to be considered a lossy medium, a fibre link is not. Another example of a lossy medium is a copper telephone wire which is used to transport xDSL (Digital Subscriber Line) signals between an access multiplexer e.g. a DSLAM and the customer premises equipment, e.g. an ADSL or VDSL modem of the end-user.

One way to resolve the problem of corrupted information or information loss relies on adding error detection codes or error correction codes to the information. Examples are Cyclic Redundancy Check (CRC) and Parity bits. Either of these can be added to a piece of information, and the receiver is able to generate the CRC or parity bit based on the information which was received. By comparing the received CRC or parity information with the generated CRC or parity information, the receiver is able to detect and eventually correct corrupted information.

A document published by Xilinx on Mar. 23, 2001 entitled "IEEE 802.3 Cyclic Redundancy Check" describes the working of CRC32 and its use at the data link layer.

Error correction does not only detect corrupted information. It is also able to correct (limited) corruption. Where the transmitter for instance encodes the information with a convolution code, for like the Trellis diagram, and the receiver decodes the information using for instance the Viterbi algorithm, a number or errors resulting from transmission over a lossy medium, may be corrected at the receiver's end.

When information is lost or the information is corrupted beyond repair, retransmission is a common method to recover the information. A receiver can track which information has been received in comparison to the information that was expected. At particular times the receiver may request the missing information to be retransmitted. In other words, the transmitter assumes correct delivery of each packet unless explicitly informed about a failure. Another retransmission scenario wherein the transmitter keeps track of all the information that was sent but is not yet acknowledged by the receiver requires more intelligence from the transmitter. Such intelligence involves recording the time between transmitting a packet and receiving an acknowledgement, and in case this time is too long or no acknowledgement is received, automatically retransmitting the packet.

An example of protocols used for retransmission are Automatic Repeat reQuest (ARQ) protocols. There are several variants of the ARQ protocol, for instance Stop and Wait ARQ or Sliding Window ARQ. An explanation on these forms of ARQ can be found in IETF RFC 3366, published in August 2002, in particular section 1.4 thereof. RFC 3366 can be retrieved from the Internet via the URL: http://www.ietf.org/rfc/rfc3366.txt.

Digital information is typically sent over the medium in pieces called packets which are of limited size. The packet size can be fixed, e.g. Asynchronous Transfer Mode (ATM) cells, or variable, e.g. Internet Protocol (IP) packets. When a part of these packets consists of a CRC block, the effective bandwidth decreases and relatively more packets are required to transmit a particular set of information. For example: if 1024 bits of information are to be transmitted and packets are 128 bits large, 8 packets are required to transmit all the information. In case each packet contains 16 bits of CRC code, only 112 bits of information fit in a single packet and 10 packets are required to transmit all the information.

In cases where retransmission is used to recover from corrupted packets or lost packets, overhead is introduced as well. A single packet is transmitted and retransmitted, taking up the time and bandwidth of a different packet. Referring to the previous example, if 8 packets are to be sent, but a packet is lost and requires retransmission, a total of 9 packets are transmitted over the link.

Retransmission and error detection or error correction are not the only reasons for overhead on a communication link. Several protocols provide end-to-end reliability. An example of such a protocol is the Transmission Control Protocol (TCP) which provides what appears to be a dedicated link between two endpoints. The TCP protocol describes how this link is established between source and destination and how transmission of information on this link becomes reliable irrespective of the physical medium that is used. The link appears to be dedicated as it can go over a multitude of nodes and types of links, which can be reliable or lossy.

IETF RFC 793 published in September 1981 describes the TCP protocol and illustrates how TCP can be used for reliable communication. In particular section 2.6 describes the working of TCP retransmission. RFC 793 can be retrieved from the Internet via the URL: http://www.ietf.org/rfc/rfc793.txt.

TCP numbers each segment in the stream of data that flows between source and destination. The destination can use these sequence numbers to determine which parts are still missing. The destination notifies the source of missing packets and the source can send those particular packets again. A problem with this TCP scheme is that notification of a missing packet and the retransmission are end-to-end. End-to-end retransmission creates overhead on all the links between the nodes on the route between the end systems. In case of multicast traffic, end-to-end retransmission becomes really problematic. If hundreds of systems miss a part of a stream, the single source would be flooded with retransmission requests. If only one destination is missing a packet, a retransmission request to the source may lead to excess bandwidth occupancy on all links in the multicast tree because the packet will be re-multicasted.

Applications such as triple-play, which involve the combination of regular data, voice data and video data transfer on a single link, demand higher reliability from the networks between content provider and end user. Regular data transmission is generally not time or resource critical. Retrieving emails or a website can cope with short delays in the information stream. Voice data is more critical. Although the loss of a single voice packet goes unnoticed to the human ear, loss of various packets leads to serious audible noise. The influence of lost video packets is visible to the human eye. Therefore, traffic has to be prioritized in a triple-play setup so each type of traffic is delivered timely with the necessary reliability to reduce negative effects. As lossy media are a common part of access networks and increase the probability of incorrect packets significantly, they pose a severe difficulty in deploying a triple-play network.

Another problem which arises in networks is Head Of The Line blocking (HoL). This phenomenon appears when multiple links or data flows are aggregated onto a single flow. This typically appears in situations where First In First Out (FIFO) buffers are used in some way to improve network functionality. These buffers can be used to receive information packets from incoming links before they are forwarded on an outgoing link. For instance, a device having three incoming links and one outgoing link may contain three input buffers and one output buffer. These input buffers are used as a queue for received packets before they are transmitted onto the outgoing link. Head of the Line blocking arises when information packets destined for a particular outgoing link cannot reach that link due to congestion on another link. For instance, if there are two outgoing links and three incoming links with buffers, HoL may arise when one of the outgoing links is congested and all incoming link buffers have a packet for that link at the head of the buffers. Packets with a destination on the other outgoing link can no longer reach that link because their buffer is blocked by a packet for the congested link. Another example is when a particular high priority information packet is blocked due to retransmission of a low priority packet, for instance when both packets travel end-to-end and arrive on the same incoming link of a switching or routing device It is an objective of the present invention to create a more reliable link over a lossy medium. It is another objective of the present invention to offer a more effective retransmission scheme, i.e. a retransmission scheme which introduces less overhead and which is able to respect traffic priority. It is also an objective of the present invention to provide a retransmission scheme which does not require any modifications to end systems. It is another objective of the present invention to selectively protect particular traffic and ignore other traffic for protection. It is another objective of the present invention to reduce head of the line blocking.

SUMMARY OF THE INVENTION

According to the present invention, the above described objectives are realized and the shortcomings are overcome through the use of a transmitter device for retransmitting information packets constituting a flow on a lossy link in a network as described in claim 1 comprising:
 means for receiving information packets;
 means for transmitting these information packets;
 means for receiving a retransmission request for one or more of the information packets; and
 means for retransmitting one or more of the information packets wherein the means for retransmitting are adapted to associate the information packets with subflows based on at least one traffic parameter and to retransmit one or more of the information packets in accordance with their associated subflow.

A flow consists of several types of information packets between two nodes. For instance, all the messages transmitted between a DSLAM and an xDSL modem are a single flow. Such a flow can consist of web traffic, video packets and voice packets all transmitted on the link simultaneously, and each of these traffic types or packet types are a subflow. In general, a flow within the context of the current invention is all the traffic on a particular link and a subflow is a specific type of traffic in that flow.

The transmitter device according to the present invention is able to receive an information packet which is part of a flow from a particular source such as another node in the network. It is also able to transmit this information packet to another node in the network and to receive a request for retransmission from this node. The transmitter device provides this retransmission in only a part of the network and based on the subflow to which the information packet belongs, for instance between two nodes such as a Digital Subscriber Line Access Multiplixer (DSLAM) and an xDSL modem or between a DSLAM and a set-top box at the end user (typically placed after the modem). On this link, retransmission for video traffic is handled separately from the web traffic.

The lossy link restricted retransmission scheme according to the present invention shall be implemented in software or hardware layers on particular nodes terminating the lossy medium. The nodes supplemented with the retransmission scheme according to the present invention are adapted to recognise protected information packets. If these information packets are protected using information which is already part of the packet, for instance TCP sequence numbers, the device requires the ability to process TCP headers. If packets are protected by adding a bit pattern on for instance the physical layer, e.g. a fixed amount of bits used as a packet counter, the receiving device has to be able to remove these bits from the information stream and compare the count number to the count numbers of earlier received packets to determine any lost packets for which retransmission must be requested. For optimal performance, the transmitter device may keep a local copy of the information packet for a particular amount of time or until a particular number of packets has been transmitted.

Because transmitter and receiver are able to recognize protection or are made aware thereof through additional information transmitted along with the actual information packet, they can remove eventual overhead before forwarding the information packet to the next hop in the network. Thus, if the lossy link is an intermediate link, and nodes before or after the lossy part are unaware of the protection on the lossy link, these nodes have to rely on other mechanisms to provide reliable transfer.

Typically, each packet received by the transmitter device is characterized by numerous parameters such as its source, its destination, protocols or its traffic class. These parameters can be used to identify the importance of the packet and consequently if retransmission has to be applied when sending the packet over a lossy link. The parameters can also be used to identify to which subflow a particular packet belongs and thus retransmission is also subflow based. For instance the traffic class may be used to indicate if protection has to be provided. Hashing based on source and destination addresses can provide a useful means to segregate traffic into sets of flows for protection purposes when the receiver needs to re-sequence flows. This way, sequencing per subflow can be maintained and delay for other flows in other sets that did not experience packet loss is avoided. Further, the combination of source, destination and sequence number of a higher protocol transported in the packet may provide information about to which subflow the packet belongs. Such information can be used by the receiving device to request retransmission of the packet.

The transmitter device according to the present invention offers a higher grade of reliability to higher layers involved in the data transmission. A part of the entire route between the source and destination is typically made up out of reliable, often high bandwidth, links. These can be found in core networks of service providers, Internet backbones and large company networks. Another part of the route may consist of low bandwidth, lossy media. Certain protocols such as TCP are designed to turn an unreliable link or underlying protocol such as IP into a reliable communication channel and offer such reliable communication capacities to the software using these protocols. By increasing the reliability on intermediate links, less information packets will be lost from an end-to-end perspective. Thus, protocols such as TCP will be less likely required to perform retransmission and less end-to-end retransmission is required for a particular traffic flow.

When retransmission is done end to end, every link on the path between both end systems sees the overhead of retransmissions. By adding a retransmission scheme to a specific part of the end-to-end path, other parts of the path are relieved from this overhead. This leads to higher availability of the bandwidth on these unaffected parts of the path which can be beneficial to all other traffic on these parts. An example of this is where one source, for instance a video broadcaster, streams various video fragments to several users. The broadcaster typically has a high bandwidth uplink to the Internet, after which messages will be routed to their respective destinations. If one or more of these destinations require the use of a lossy link (for instance xDSL users) retransmission may be required. If these retransmissions are done on an end-to-end basis, the single uplink of the broadcaster is put under extra load by the retransmission of information packets. If however, the retransmission is confined to devices on the lossy link, a broadcaster retains full bandwidth for the delivery of their video fragments to all users.

The retransmission scheme according to the present invention is aware of particular traffic parameters to ensure priority of traffic and because protecting all traffic is not always feasible. Protecting all possible traffic flows may lead to hardware issues, for instance when providing a device with buffers. Generally there is at least one buffer for each line arriving at a device called an input buffer and at least one buffer for each line starting at the device called an output buffer. Input buffers are used to store any incoming information packets before they are processed on the device. The output buffers are used to store all the packets which have to be transmitted on a particular line. Another common use of these buffers is to temporarily store information packets in a buffer after they have been transmitted to allow quick retransmission on the transport layer. When traffic has priorities, there should be a buffer for each class of traffic or subflow where the class or subflow is determined by specific parameters. To limit the amount of buffers and thus maintain a realistic amount of required buffers, only traffic with a select group of parameter values may be protected. Some traffic may be able to deal with additional delays, such as those from end-to-end retransmission. Therefore it is acceptable for some traffic subflows to be protected and other traffic subflows to be left unprotected through retransmission. An operator could define that only streaming video has to be protected on the link between the DSLAM and the modem of the end user, ensuring good quality video. Other traffic subflows, such as email traffic can be ignored by the protection scheme according to the present invention and depend on other protocols or mechanisms to ensure correct delivery of the email.

Another advantage of a selective retransmission scheme is the reduction of Head of the Line blocking. If for some reason a particular flow is blocked and thus delayed, traffic flows with different parameters are still able to flow and incorporate retransmission support. Only the flow which is blocked and eventual other flows with similar traffic parameter values will be delayed while all other flows can continue to be transmitted to the receiver device. A reduction in head of the line blocking can increase overall performance as the available bandwidth is used more efficiently. When a single packet blocks all traffic, not all available bandwidth is used, if however only a single flow is blocked, every other flow can use the available bandwidth.

Another problem of HoL blocking is found in receivers performing packet re-sequencing before further processing. If multiple packets are received, they can be out of order and the receiver may rearrange the packets into their original order, this process is called packet re-sequencing. In case a packet from a flow is lost, the receiver has to wait for that packet before re-sequencing can be completed and the flow can be processed further. These packets are delayed and cause additional delay on the flows which did not see any packet loss. In other words, a single flow blocks several other flows going on the same link. The present invention selects the traffic flows based on a particular flow, and treats each flow independently. Therefore, if a single flow is blocked, for instance due to a re-sequencing awaiting a retransmission, the other flows can continue and are not blocked.

An optional feature of the present invention is that the means for retransmitting may be adapted for Point-to-Point retransmission for at least one of the subflows as described in claim 2.

An end-to-end connection can consist of multiple intermediate systems and links. For example the source has a link to a router of a service provider. This service provider may have a link to a router of an Internet backbone operator. Another service provider may be connected to the backbone operator as well, and have a user connected to one of their routers. Any information packet sent from one user to the other has to pass the routers of the services providers and the backbone operator. So, each router is an intermediate node and the link between two nodes is an intermediate link to the link between both end users. A point-to-point link is such an intermediate link, for instance between a service provider and a backbone operator. Generally, service providers and backbone operators need highly reliable links to each other to provide access to all their customers. The path between a service provider and an end user may be less reliable and could consist of a lossy link.

Point-to-point retransmission between DSLAM and modem removes any additional protective requirements on the devices located in an end-user network. The DSLAM adds protection for particular subflows, the modem uses and removes the protection and transmits the information packets onto the devices in the end-user network. These devices could be a set-top box for digital TV or regular computers. This allows the lossy copper telephone line between modem and DSLAM to be used as a more reliable medium. Another example of a Point-to-Point connection is the radio wave link between a Wireless Access Point (WAP) and a Wireless Network Interface Card (WNIC) found in a personal computer. Wireless links experience interference from radiation which is typically found in the air. Sources of radiation can be microwaves, DECT telephones, cellular phones, fluorescent lamps, electromagnetic engines, computers with switched-mode power supplies, overhead powerlines, . . . . All of these may influence the transmitted information in such a way that retransmission is required. The current invention can provide on the fly recovery of lost information between the WAP and WNIC and reduces the end-to-end retransmission requests.

Another optional feature of the transmitter device according to the present invention involves adding at least one additional header to the information packet by the means for transmitting, as described in claim 3.

The header contains information about which information packet it is, for instance by adding a sequence number for each information packet in this header. A new proprietary header can be used or existing types of headers can be used in a new way. In a layer 2 device for instance, a VLAN header can be used to contain the sequence number. A receiving device may record which numbers were received and request a retransmission based on the sequence number of an information packet which was not received.

In another instance of the transmitter device according to the present invention, the retransmission operation is performed transparent to the end systems, as described in claim 4.

Providing protection to particular subflows in parts of the network in a transparent way provides greater compatibility with existing and new protocols. It ensures that only the nodes directly related to the lossy link need to be adapted. Transparency can be achieved with a hardware modification, such as a chip added to a transmitter device or by a software modification enabling the firmware of a device or the software running thereon to protect the subflows. This modification can encapsulate information packets to add protection or interpret information packets and use information therein for protection. Either kind of modification can operate transparently for the end systems as they have no knowledge of intermediate modifications of information packets. Transparency makes it possible for existing protocols such as TCP or UDP to be used on lossy media without any changes to the protocols.

Another optional feature of the transmitter device according to the present invention is that the traffic parameter corresponds to a traffic class of the information packet as described in claim 5.

Each traffic flow is characterized by parameters. Examples of parameters are traffic class, source or destination and used protocols. The traffic class is typically used in a Quality of Service (QoS) aware network to assign priorities to the information packets. The present invention recognizes these priorities by selecting the traffic or subflow to be protected based on the traffic class. Embodiments of the present invention may be designed to protect several subflows and prioritize their retransmission using the same selection criteria as QoS aware nodes use.

A further optional feature of the transmitter device according to the present invention is that the transmitter device may be integrated into an Access Multiplexer as described in claim 6.

A typical use for the present invention would be in providing triple-play applications to xDSL subscribers. Generally such xDSL subscribers are connected to an Access Multiplexer, named a DSLAM, by copper telephone wires. These wires are prone to information loss, and therefore the modification of a DSLAM to support the present invention would increase reliability on such a link. Also in other access multiplexers connected to lossy media, for example a public wireless access point gathering traffic from multiple sources and placing the aggregated traffic on a single link to for instance the Internet, the retransmission scheme according to the present invention may substantially increase the reliability without dramatic impact on the overall network load. Wireless media are lossy, so incorporating the present invention in such a public wireless access point may provide better service to the users.

The current invention further relates to a receiver device as defined in claim 7, comprising:
  means for receiving information packets;
  means for transmitting a retransmission request for at least one of the information packets; and
  means for receiving a retransmission of at least one of the information packets, with the retransmission request being associated with a subflow and with the means for transmitting a retransmission request being adapted to send the request in part of the network.

The retransmission according to the current invention indeed requires corresponding adaptations in the transmitter and the receiver. The receiver defined in claim 7 is able to process information packets sent by the transmitter device as described in claim 1. The receiver device is able to determine the traffic parameters of an information packet and thus the subflow to which an information packet belongs, in order to check for retransmission protection and further may be adapted to alter the information packet in a way enabling transmission to other nodes not supporting the protection mechanism according to the present invention.

The present invention in addition relates to a corresponding method for retransmitting an information packet on a lossy communication link as defined in claim 8, comprising the following steps:
  receiving an information packet associated with a subflow by a transmitter device;
  transmitting the information packet from the transmitter device to a receiver device;
  transmitting a retransmission request associated with that subflow by the receiver device;
  receiving the retransmission request by the transmitter device; and
  retransmitting the information packet to the receiver device, the retransmission being performed in the corresponding subflow and in only a part of the network.

This method describes a non-exhaustive list of steps involved in performing the present invention. A transmitter and a receiver device are required to cooperate and coordinate traffic. The transmitter receives the information packet which is related to a particular subflow, performs conventional packet processing tasks such as routing, switching or modulating or demodulating, adding retransmission protection and transmits the information packet to a different node. In a case where the information packet is not received by the receiver device, the latter receiver requests a retransmission from the transmitter device. The transmitter device therefore retransmits the information packet to the receiver device which may or may not receive the retransmission. The retransmission is restricted to a part of the network, e.g. the point-to-point link between transmitter and receiver, and shall be applied depending on traffic parameters values associated with this packet, e.g. traffic class where the packet belongs to.

DETAILED DESCRIPTION OF EMBODIMENTS

Figure 1:
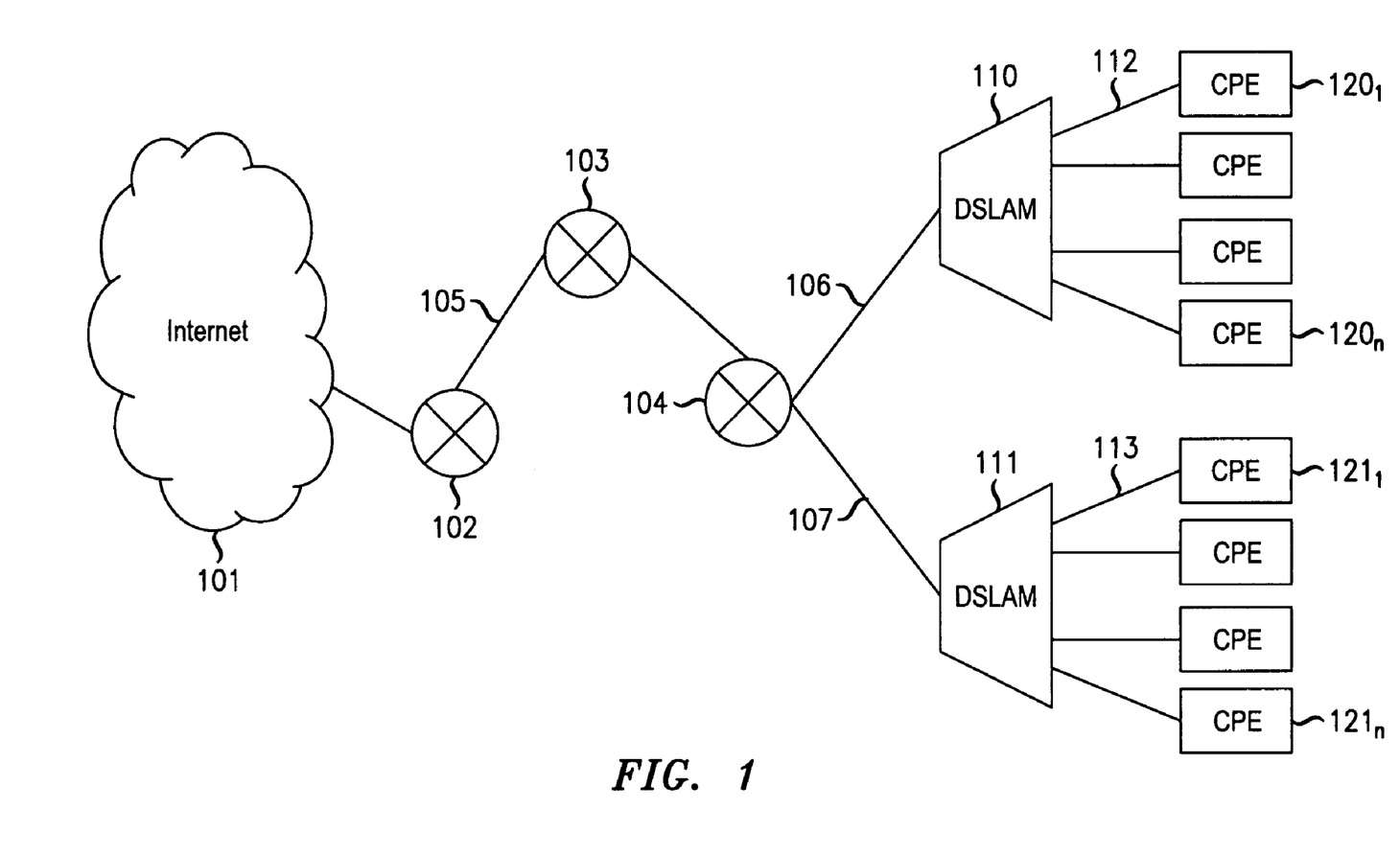
FIG. 1 illustrates a network topology wherein multiple end user systems are connected to the Internet through xDSL.

FIG. 1 gives a general overview of a network wherein an embodiment of the present invention is used. FIG. 1 shows the Internet 101 and intermediate routers 102, 103 and 104. These routers 102, 103 and 104 are able to direct traffic of various types, such as Asynchronous Traffic Mode (ATM) cells or Internet Protocol (IP) packets, to particular destinations. Digital Subscriber Line Access Multiplexers (DSLAM) 110 and 111 are connected to router 104 via respective links 106 and 107, and are responsible for downstream delivery of traffic to the customer premises equipment (CPE) such as xDSL modems $120_1$ to $120_n$ and $121_1$ to $121_n$ and for upstream aggregation of traffic coming from the xDSL modems $120_1$ to $120_n$ and $121_1$ to $121_n$.

Links between routers, for instance link 105 between routers 102 and 103 are typically reliable due to the physical nature thereof. For instance, optical fibre links between two routers are highly reliable due to their low error rate and limited influences from the outside of the fibre. Optical devices are not prone to influences from equipment terminating the link at either end, contrary to for instance copper based media where near-end crosstalk may degrade the performance and reliability of a link. Links between a DSLAM and the customer premises equipment, such as link 112 between DSLAM 110 and modem 120, or link 113 between DSLAM 111 and modem $121_1$ are generally of lower quality. Before technologies such as xDSL came into existence, the physical medium where over such links are deployed were only used for telephone traffic, occupying only a small portion of the available bandwidth, i.e. the low frequency portion, which is less sensitive to information loss. Typically these links are copper wires which are more prone to failure and are considered lossy links.

DSLAMs 110 and 111 are access multiplexers and their main purpose is receiving traffic from a, typically reliable, uplink 106 or 107 and distributing the traffic to the respective destinations over lossy links such as 112 and 113. The access multiplexer is also responsible for receiving upstream traffic from the customer premises equipment $120_1$ to $120_n$ and $121_1$ to $121_n$, and aggregating all this traffic onto a single uplink 106 or 107.

Customer premises equipment $120_1$ to $120_n$ and $121_1$ to $121_n$, are xDSL modems which terminate the respective subscriber lines extending from the DSLAMs 110 and 110, and are able to convert the signals from the DSLAM into signals which can be processed by a set-top box, personal computer or other in-house equipment.

A provider of content, such as an online video delivery service is generally reachable via the Internet. A set-top box can be used to request a particular video fragment from the provider. Such a request is transmitted from the set-top box through customer premises equipment such as modem $120_1$ to a DSLAM such as 110. The DSLAM will forward the request to the Internet through respectively routers 104, 103 and 102. Router 102 in turn will address on the basis of its routing tables the node in the Internet that can be used to deliver the request.

Multicasting is a more efficient way of delivering content to a large set of users when compared to unicast. In unicast, the source has to establish a connection to every destination to deliver each destination its own copy of a packet. Such a connection can be a physical connection or a virtual connection such as those used by certain protocols (e.g. TCP). Unicast requires that every destination has its own copy of a packet. This implies that if 500 users request the same video fragment, the source has to transmit that same fragment 500 times. Multicasting however, only requires a single copy of the fragment to be transmitted and this copy will be distributed in a tree-like manner to the various destinations that requested the fragment. If for example all the users connected to DSLAMS 110 and 111 request the same fragment from a single source, and this fragment is transmitted using multicast by that source, only a single copy of the fragment will reach router 104. It is then up to router 104 to duplicate the fragment and deliver it to the users interested in receiving it. A similar situation would occur when retransmission is required in an end-to-end solution, all the end systems would request a retransmission from the source, and all users receiving the multicast would receive that retransmission. It is obvious that if multiple end-systems require a retransmission, all of the end-systems will receive these retransmissions as they are multicasted as well.

Figure 2:
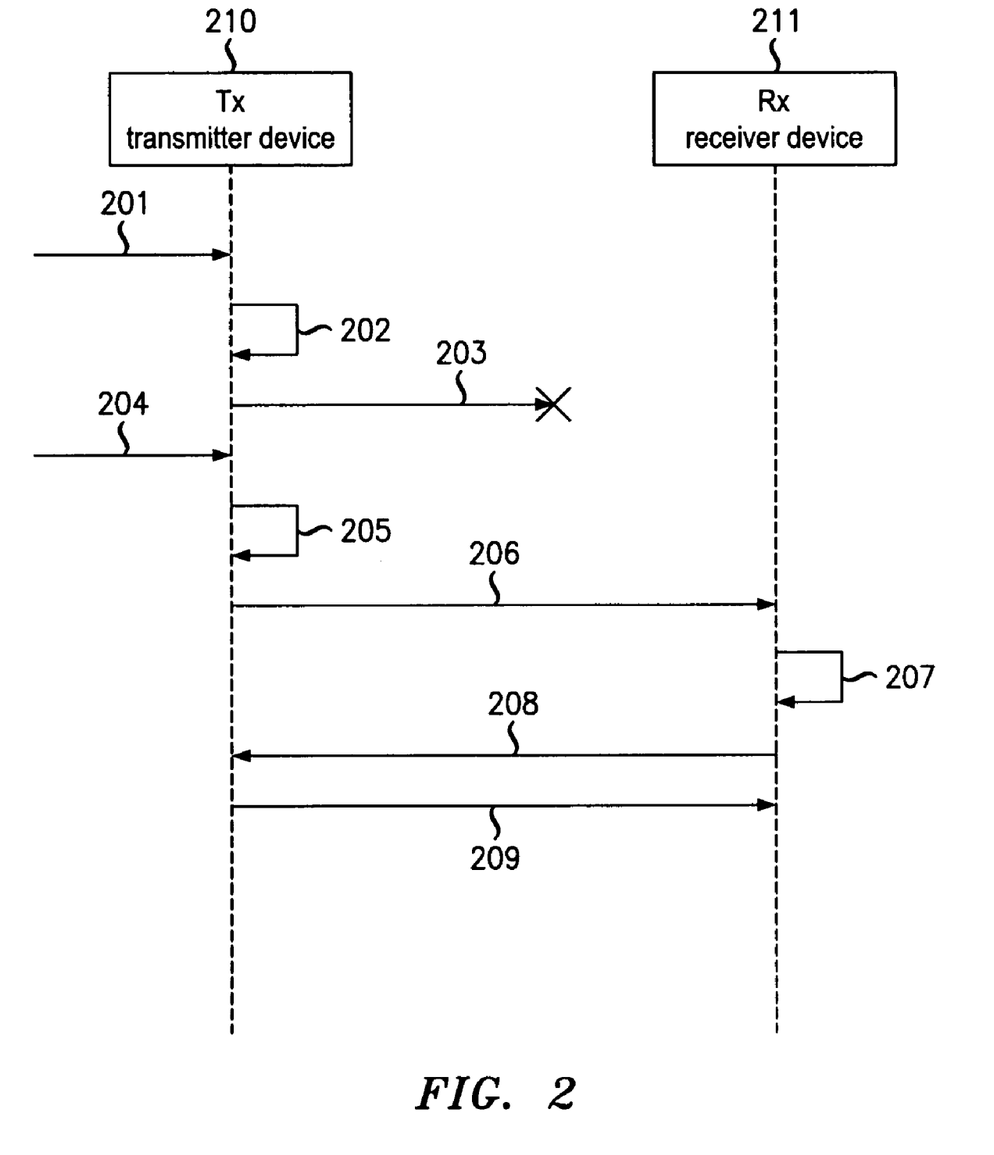
FIG. 2 is a message flow diagram illustrating an embodiment of the retransmission method according to the present invention.

To avoid these additional multicast retransmissions, DSLAMs 110 and 111 and customer premises equipment $120_1$ to $120_n$ and $121_1$ to $121_n$ are equipped with transmitters and receivers operating according to the present invention. FIG. 2 shows a conceptual message flow between a transmitter Tx 210 and a receiver Rx 211. For instance, this message flow can be seen between DSLAM 110 and customer premises equipment $120_1$, on link 112, or between DSLAM 111 and customer premises equipment $121_1$, on link 113.

In FIG. 2, it is assumed that the Tx device 210 receives information packets from a non-lossy uplink (e.g. links 106 or 107 in FIG. 1) and then forwards these packets to a particular Rx over a lossy link, e.g. links 112 and 113 in FIG. 1. How the Rx device 211 processes the received packets is not relevant to the illustration of the present invention and therefore any additional steps executed by the Rx device 211 are not illustrated in FIG. 2. It should be noted that the Rx device 211 may alter the encoding of the received packets before transmitting them to another device such as a personal computer or set-top box or that the Rx device 211 may be able to process a received packet and deliver the information packet to an application which is executed by the Rx device 211 or another device hosting Rx 211 or connected to Rx 211. Any connection between the Rx device 211 and subsequent devices, such as a personal computer may be lossy or reliable and transmission thereon may or may not be protected by another instance of the retransmission scheme as described in the present invention.

In step 201, Tx device 210 receives an information packet, hereafter referred to as packet_1, from a source such as an uplink to an Internet service provider, for instance link 106 in FIG. 1. Packet_1 is then copied in step 202 into a temporary storage such as a First In First Out buffer, a circular buffer or a form of volatile memory. Rx device 211 can use this locally stored copy of packet_1 in case retransmission is required. After storing packet_1, it is transmitted in step 203 onto the next node via the lossy link. In this example, transmission 203 fails and packet_1 does not reach Rx 211. Meanwhile, a new information packet, hereafter referred to as packet_2, is received by Tx device 210 as is indicated by reference 204 in FIG. 2. Packet_2 is stored in step 205 in the same temporary storage as packet_1 without replacing packet_1. For instance, if a FIFO buffer is used as temporary storage, packet_1 is placed in the first slot of the buffer, packet_2 in the second slot. When using volatile memory, packet_1 may be stored at the start of the memory and packet_2 can be stored in successive memory locations of the volatile memory. Packet_2 is then forwarded in step 206 to the Rx device 211 and received by the Rx device 211. After receipt, Rx device 211 will process packet_2 in step 207 and determine that packet_1 is missing. Rx device 211 requests a retransmission for packet_1 in step 208 from the Tx device 210, which in turn will then retransmit packet_1 as is indicated by reference 209 in FIG. 2.

Figure 3:
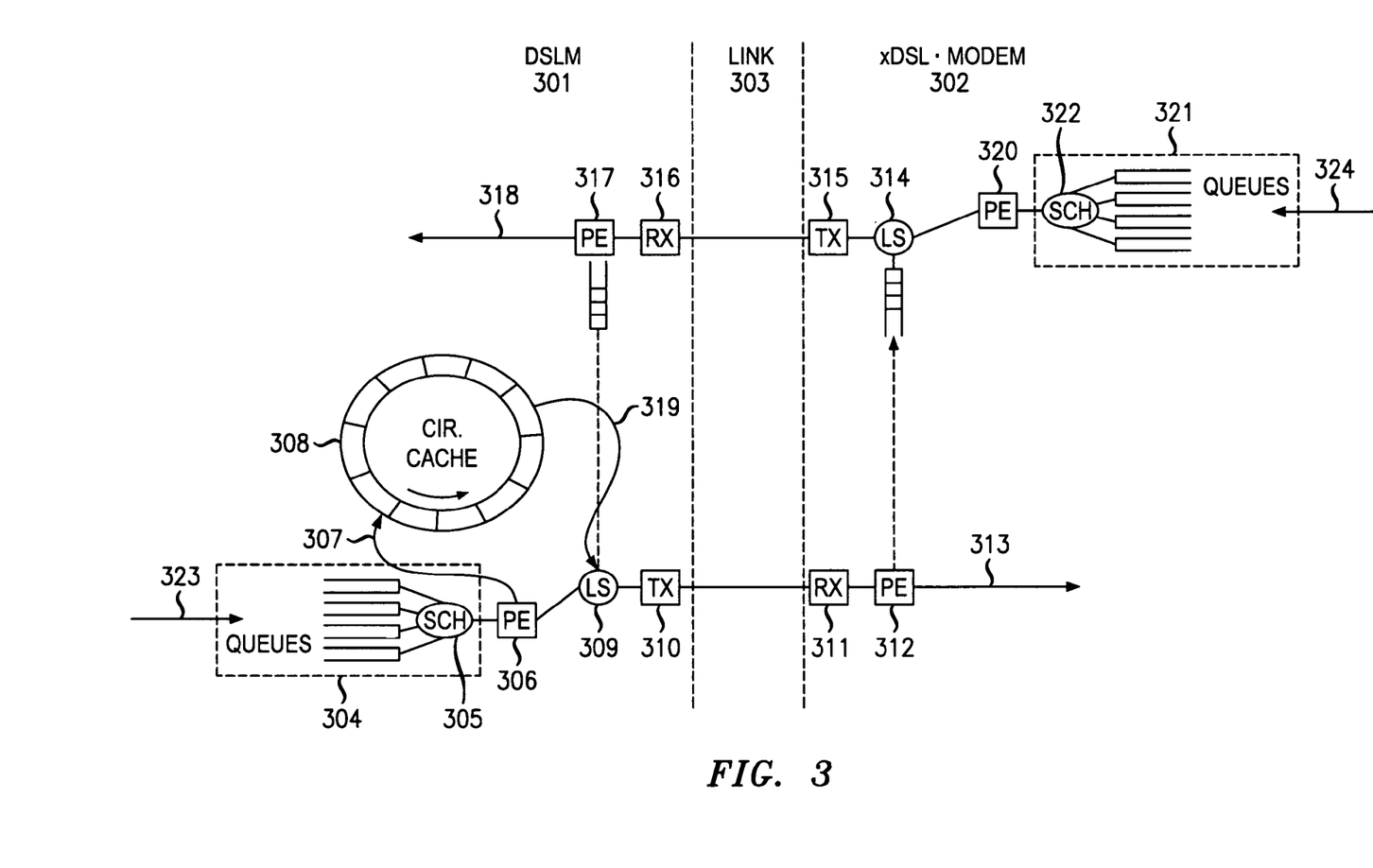
FIG. 3 illustrates an embodiment of the present invention at a conceptual hardware level.

FIG. 3 further illustrates the above embodiment of the present invention through a hardware diagram. A transmitter device, such as a DSLAM 301, is located on the left side of the drawing and a receiver device, such as an xDSL modem 302, is located on the right side. Between the transmitter 301 and the receiver 302 is a lossy copper wire link 303, for instance a DSL link.

Firstly transmission by the DSLAM 301 is described in more detail. For sake of clarity, it can be assumed that DSLAM 301 corresponds to DSLAM 110 of FIG. 1 and the customer premises equipment 302 corresponds to xDSL modem 120, of FIG. 1. Generally, traffic is received in packets from a reliable link 323 and placed in a particular queue 304 selected depending on for instance traffic parameters or destination. A scheduler 305 is used to select a queue from which the next packet will be transmitted onto the DSL link 303. However, before the packet is transmitted, a packet editor 306 adds a header to the packet. This header can be used to identify the packet as a member of a particular message flow, the position or order of the packet in that flow, and to determine if a packet in the flow is missing and should be retransmitted. Additionally, the packet is copied into a circular cache 308 for later retransmission as is indicated by reference 307 in FIG. 3. The circular cache 308 has a limited amount of slots and therefore can hold only a limited amount of packets. As a result, this embodiment will fill the cache 308 and when all slots are used, it will overwrite the oldest packet in the cache. After these two steps, a line scheduler 309 will deliver the packet to the actual transmitter part 310 of the DSLAM 301 which transmits the packet to the xDSL modem 302 over the DSL line 303.

The xDSL modem 302 has a receiving part 311 which is connected to the DSL line 303 and which delivers the received packet to a packet editor 312. This packet editor 312 will determine if the packet has to be forwarded on link 313 for further processing, for instance transmission to a personal computer, or that a retransmission has to be requested. Further processing also involves removing the added protection header before the packet is delivered to for instance the next node or device. When the packet editor 312 determines that a packet is missing from a message flow, retransmission of the missing packet has to be requested.

The packet editor 312 provides information which identifies the missing packet to a line scheduler 314 in the modem 302. This scheduler 314 is then responsible for delivering a retransmission request to the transmitter part 315 of the modem 302, which is connected to the DSL line 303.

The receiver part 316 of the DSLAM 301 is connected to the other end of the DSL line 303, and receives these requests from the modem 302. The packet editor 317 on the receiving side of the DSLAM 301 can detect the type of packet, either a regular packet or a retransmission request, and process this packet. In case of a regular packet, it is forwarded for further processing 318, and if this regular packet is protected by the retransmission scheme, additional headers are removed before forwarding by the packet editor 317. If a retransmission request is received, the information that can be used to identify the lost packet is retrieved from the request and passed to the line scheduler 309. The scheduler DSLAM 309 retrieves 319 that particular packet from the circular cache 308 and delivers it to the transmitter part 310.

The xDSL modem 302 is also able to transmit protected packets to the DSLAM 301. Thereto the packet editor 320 is used to add additional headers to the packet which can be used to uniquely identify each packet that is transmitted to DSLAM 301. These packets are selected from a queue 321 by a queue scheduler 322. This scheduler 322 is constructed in such a way that it selects the most optimal queue from which the next packet is delivered to the transmitter part 315. These queues are filled with packets received from for instance a personal computer connected to the modem through link 324.

Both directions are protected using a retransmission scheme as they use the same lossy medium, DSL link 303. This medium can support simultaneous traffic in both directions (full-duplex) or only traffic in a single direction (half-duplex). It should be obvious that the use of full-duplex is preferred to increase the overall throughput of the link. Full-duplex does not require one transmitter to wait for the other transmitter to finish, so while a retransmission request is sent, the next packet in a flow may be arriving.

It should be noted that it is not required to have retransmission protection in both directions. An end-user is less likely to be a source for time and resource critical traffic and therefore does not require such protection. In such a case there is no need for a packet editor 320 in the modem. Additionally, there is no circular cache on the modem side in FIG. 3. However a cache is also present in this embodiment and operates in a similar way as the cache on the DSLAM side. There is however no requirement for the cache to be circular, a random access memory may be used along with a table to track where a specific packet is stored in the random access memory. In general, the use of some type of temporary storage is advised to speed up retransmission, but it is not required.

In addition, a DSL line is used in FIG. 3 to illustrate a lossy link, but lossy links are not limited to DSL lines. Various low quality wires, wires in bad condition or circumstances and wireless connections are all prone to information loss. Bad conditions for instance result from damaged insulation and bad circumstances are situations such as high radiation, bad connectors introducing near end crosstalk, etc. Wireless connections are influenced by electromagnetic waves of various origins in the air. All of these and other reasons may cause information loss on a link or increase the probability thereon.

It should further be noted that in addition to the possibility to use other lossy media, this embodiment can be used in other devices. For instance, when using wireless links as lossy medium, the DSLAM of FIG. 3 can be replaced with a wireless access point and the DSL modem of FIG. 3 can be replaced by a wireless network interface card. All of these devices can use the concepts set forth in the above description of FIG. 3 without any alteration to the concept.

Although the present invention has been illustrated by reference to specific embodiments, it will be apparent to those skilled in the art that the invention is not limited to the details of the foregoing illustrative embodiments, and that the present invention may be embodied with various changes and modifications without departing from the spirit and scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the spirit and scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", and the like, when used in the description or in the claims are introduced to distinguish between similar elements or steps and are not necessarily describing a sequential or chronological order. It is to be understood that the terms so used are interchangeable under appropriate circumstances and embodiments of the invention are capable of operating according to the present invention in other sequences, or in orientations different from the one(s) described or illustrated above.

The invention claimed is:

1. A transmitter device for transmitting information packets on a lossy communication path in a network, said information packets constituting a flow, said transmitter device comprising:
   means for receiving said information packets;
   means for transmitting said information packets;
   means for receiving a retransmission request for at least part of said information packets; and
   means for retransmitting said part of said information packets,
   wherein said means for retransmitting is configured to associate said information packets with subflows based on at least one traffic parameter and to retransmit said part of said information packets in accordance with their associated subflow,
   wherein said flow includes information packets of more than one traffic type, the flow including one or more subflows,
   wherein said subflow includes information packets of a single traffic type, wherein each traffic type is defined by the at least one traffic parameter,
   wherein each traffic parameter designates at least one of a traffic class of the subflow, a source of the subflow, a destination of the subflow, and a protocol used by the subflow.

2. A transmitter device for transmitting information packets on a lossy communication path as described in claim 1, wherein said means for retransmitting is configured for Point-to-Point retransmission for at least one of said subflows.

3. A transmitter device for transmitting information packets on a lossy communication path as described in claim 1, wherein said means for transmitting is configured to add at least one additional header to said information packet.

4. A transmitter device for transmitting information packets on a lossy communication path as described in claim 1, wherein said means for retransmitting is configured to retransmit said information packet without knowledge by end systems.

5. A transmitter device for transmitting information packets on a lossy communication path as described in claim 1, wherein said at least one traffic parameter designates the traffic class of said information packet, the traffic class being an assigned priority of the information packet used by a Quality of Service aware network.

6. A transmitter device for transmitting information packets on a lossy communication path as described in claim 1, wherein said device is integrated into an Access Multiplexer.

7. A receiver device for receiving information packets on a lossy communication path in a network, said receiver device comprising:
   means for receiving information packets, the information packets constituting a flow;
   means for transmitting a retransmission request for at least part of said information packets; and
   means for receiving a retransmission of part of said information packets, and wherein said retransmission request is associated with a subflow and that said means for transmitting said retransmission request is configured to send said request in part of the network,
   wherein said flow includes information packets of more than one traffic type, the flow including one or more subflows,
   wherein said subflow includes information packets of a single traffic type,
   wherein each traffic type is defined by at least one traffic parameter, wherein each traffic parameter designates at least one of a traffic class of the subflow, a source of the subflow, a destination of the subflow, and a protocol used by the subflow.

8. A method for transmitting an information packet on a lossy communication path between a transmitter device and a receiver device in a network, said method comprising:
   receiving an information packet associated with a subflow by said transmitter device;
   transmitting said information packet from said transmitter device to said receiver device;
   transmitting a retransmission request associated with said subflow by said receiver device;
   receiving said retransmission request by said transmitter device; and
   retransmitting said information packet to said receiver device,
   wherein said retransmitting said information packet is done within said subflow corresponding to at least one traffic parameter and in only part of the network,
   wherein said subflow includes information packets of a single traffic type, wherein each traffic type is defined by the at least one traffic parameter,
   wherein each traffic parameter designates at least one of a traffic class of the subflow, a source of the subflow, a destination of the subflow, and a protocol used by the subflow.

* * * * *